(12) United States Patent
Yoshinaga et al.

(10) Patent No.: US 11,456,635 B2
(45) Date of Patent: Sep. 27, 2022

(54) MAGNET EMBEDDED TYPE MOTOR AND METHOD FOR MANUFACTURING THE SAME

(71) Applicant: TOYOTA JIDOSHA KABUSHIKI KAISHA, Toyota (JP)

(72) Inventors: Fumitaka Yoshinaga, Toyota (JP); Akira Yamashita, Toyota (JP)

(73) Assignee: TOYOTA JIDOSHA KABUSHIKI KAISHA, Toyoto (JP)

( * ) Notice: Subject to any disclaimer, the term of this patent is extended or adjusted under 35 U.S.C. 154(b) by 217 days.

(21) Appl. No.: 17/017,939

(22) Filed: Sep. 11, 2020

(65) Prior Publication Data
US 2021/0083535 A1 Mar. 18, 2021

(30) Foreign Application Priority Data
Sep. 18, 2019 (JP) ............................. JP2019-169003

(51) Int. Cl.
| | |
|---|---|
| H02K 1/27 | (2022.01) |
| H01F 1/153 | (2006.01) |
| H02K 1/02 | (2006.01) |
| H02K 1/16 | (2006.01) |
| H02K 15/03 | (2006.01) |
| H02K 1/276 | (2022.01) |

(52) U.S. Cl.
CPC .......... *H02K 1/2766* (2013.01); *H01F 1/153* (2013.01); *H02K 1/02* (2013.01); *H02K 1/16* (2013.01); *H02K 15/03* (2013.01)

(58) Field of Classification Search
CPC .. H01F 1/153; H01F 1/15333; H01F 41/0226; H02K 1/16; H02K 1/2766; H02K 1/02; H02K 15/03

USPC ...................................................... 310/156.53
See application file for complete search history.

(56) References Cited

U.S. PATENT DOCUMENTS

| | | | | |
|---|---|---|---|---|
| 8,803,394 | B2* | 8/2014 | Sano | ..................... H02K 1/2766 310/216.106 |
| 8,890,385 | B2* | 11/2014 | Sano | ..................... H02K 1/2766 310/156.53 |

(Continued)

FOREIGN PATENT DOCUMENTS

| | | | | |
|---|---|---|---|---|
| CN | 106026425 B | * | 5/2019 | ............... H02K 1/02 |
| JP | 2017-147810 A | | 8/2017 | |
| JP | 2019-221127 A | | 12/2019 | |

*Primary Examiner* — Alex W Mok
(74) *Attorney, Agent, or Firm* — Sughrue Mion, PLLC

(57) ABSTRACT

An magnet embedded type motor capable of reducing a counter electromotive voltage while suppressing reduction of a torque is provided. The magnet embedded type motor of the present disclosure includes a stator and a rotor rotatably disposed inside the stator. The rotor includes a rotor core and a plurality of magnet groups embedded in the rotor core along a circumferential direction, the rotor core includes a plurality of laminated metal foils. The rotor core has a pair of radially arranged magnet holes, a center side magnetic flux leakage prevention hole, and center side bridge portions for each magnetic pole. A pair of radially arranged magnets are embedded in the radially arranged magnet holes. In the rotor core, the center side bridge portion, a center portion, and an inter-magnetic pole portion are made of a nanocrystalline soft magnetic material, and another portion is made of an amorphous soft magnetic material.

2 Claims, 8 Drawing Sheets

(56) References Cited

U.S. PATENT DOCUMENTS

| | | | |
|---|---|---|---|
| 8,957,561 B2* | 2/2015 | Sano | H02K 1/2766 |
| | | | 310/156.56 |
| 9,231,445 B2* | 1/2016 | Sano | H02K 1/2766 |
| 2013/0234540 A1* | 9/2013 | Tsutsui | H02K 19/103 |
| | | | 310/46 |
| 2018/0254677 A1* | 9/2018 | Shibamori | H02K 1/27 |
| 2018/0278100 A1* | 9/2018 | Zhu | H02K 15/03 |
| 2019/0207441 A1* | 7/2019 | Takeuchi | H02K 19/10 |
| 2019/0386548 A1 | 12/2019 | Yoshinaga et al. | |

\* cited by examiner

MAGNET EMBEDDED TYPE MOTOR AND METHOD FOR MANUFACTURING THE SAME

CROSS REFERENCE TO RELATED APPLICATIONS

The present application claims priority from Japanese patent application JP 2019-169003 filed on Sep. 18, 2019, the entire content of which is hereby incorporated by reference into this application.

BACKGROUND

Technical Field

The present disclosure relates to a magnet embedded type motor that includes a stator around which a coil is wound and a rotor rotatably disposed inside the stator, and a method for manufacturing the same.

Description of Related Art

Conventionally, a motor that includes a stator around which a coil is wound and a rotor disposed inside the stator rotatably around a rotation axis with respect to the stator has been used. Among the motors, for example, a magnet embedded type motor (for example, IPM (Interior Permanent Magnet) Motor) disclosed in JP 2017-147810 A includes a rotor core through which a rotary shaft is inserted, the rotor core is provided with magnet holes penetrating in a rotation axis direction, and magnets are embedded in the magnet holes.

SUMMARY

In the above-described interior permanent magnet motor, while increase of the rotation speed of the rotor increases a counter electromotive voltage, decreasing a magnetic flux density of a permanent magnet to reduce the counter electromotive voltage causes decrease in torque.

The present disclosure has been made in view of the above-described problem, and the present disclosure provides a magnet embedded type motor capable of reducing a counter electromotive voltage while suppressing reduction of a torque, and a method for manufacturing the same.

To solve the above-described problems, a magnet embedded type motor of the present disclosure comprises a stator and a rotor rotatably disposed inside the stator. The stator includes a stator core and a coil wound around the stator core. The rotor includes a rotor core and a plurality of magnet groups, the rotor core includes a plurality of laminated metal foils, and the plurality of magnet groups are embedded in the rotor core along a circumferential direction and form a plurality of respective magnetic poles. The rotor core has a pair of radially arranged magnet holes, a center side magnetic flux leakage prevention hole, and center side bridge portions for each magnetic pole. The pair of radially arranged magnet holes extend in a radial direction in an outer peripheral portion. The center side magnetic flux leakage prevention hole extends in a circumferential direction between center side ends of the pair of radially arranged magnet holes. The center side bridge portions separate the pair of radially arranged magnet holes from the center side magnetic flux leakage prevention hole. A pair of radially arranged magnets are embedded in the pair of radially arranged magnet holes of the rotor core. The pair of radially arranged magnets are included in the magnet group and extend in the radial direction. In the rotor core, the center side bridge portion, a center portion on the center side with respect to the outer peripheral portion, and an inter-magnetic pole portion between the magnetic poles mutually adjacent in the circumferential direction are made of a nanocrystalline soft magnetic material, and another portion is made of an amorphous soft magnetic material.

The present disclosure can reduce the counter electromotive voltage while suppressing the reduction of the torque.

A method for manufacturing a magnet embedded type motor of the present disclosure is a method for manufacturing a magnet embedded type motor that includes a stator and a rotor rotatably disposed inside the stator. The method comprises: preparing a metal foil made of an amorphous soft magnetic material, the metal foil with a shape corresponding to a shape of a rotor core of the rotor, the metal foil being provided with a pair of radially arranged magnet holes, a center side magnetic flux leakage prevention hole, and center side bridge portions for each magnetic pole of the rotor, the pair of radially arranged magnet holes extending in a radial direction in an outer peripheral portion, the center side magnetic flux leakage prevention hole extending in a circumferential direction between center side ends of the pair of radially arranged magnet holes, the center side bridge portions separating the pair of radially arranged magnet holes from the center side magnetic flux leakage prevention hole; heating the center side bridge portion, a center portion, and an inter-magnetic pole portion of the metal foil to transform the heated portions to a nanocrystalline soft magnetic material while keeping a part other than the center side bridge portion, the center portion, and the inter-magnetic pole portion to an amorphous soft magnetic material, the center portion being a center side with respect to the outer peripheral portion, the inter-magnetic pole portion being between the magnetic poles mutually adjacent in the circumferential direction of the rotor; and manufacturing the rotor by laminating the transformed metal foils and embedding a pair of radially arranged magnets in the pair of radially arranged magnet holes of a laminated body of the metal foils.

The present disclosure can manufacture the magnet embedded type motor capable of reducing the counter electromotive voltage while suppressing the reduction of the torque.

EFFECT

The present disclosure can reduce the counter electromotive voltage while suppressing the reduction of the torque.

DETAILED DESCRIPTION OF THE EMBODIMENTS

A. Magnet Embedded Type Motor

The following describes an embodiment according to a magnet embedded type motor of the present disclosure.

The magnet embedded type motor of the embodiment is a magnet embedded type motor that includes a stator and a rotor rotatably disposed inside the stator. The stator includes a stator core and a coil wound around the stator core. The rotor includes a rotor core where a plurality of metal foils are laminated and a plurality of magnet groups embedded in the rotor core along a circumferential direction. The plurality of magnet groups form a plurality of respective magnetic poles. The rotor core is provided with a pair of radially arranged magnet holes, a center side magnetic flux leakage prevention hole, and center side bridge portions for each magnetic pole. The pair of radially arranged magnet holes extend in a radial direction in an outer peripheral portion. The center side magnetic flux leakage prevention hole extend in a circumferential direction between the center side ends of the pair of radially arranged magnet holes. The center side bridge portions separate the pair of radially arranged magnet holes from the center side magnetic flux leakage prevention hole. A pair of radially arranged magnets are embedded in the pair of radially arranged magnet holes of the rotor core. The pair of radially arranged magnets are included in the magnet group and extend in the radial direction. In the rotor core, the center side bridge portion, a center portion on the center side with respect to the outer peripheral portion, and an inter-magnetic pole portion between the magnetic poles mutually adjacent in the circumferential direction are made of a nanocrystalline soft magnetic material, and another portion is made of an amorphous soft magnetic material. Here, the "circumferential direction" and the "radial direction" mean the circumferential direction and the radial direction of the rotor core, respectively. The "center" and the "outer periphery" mean the center and the outer periphery of the rotor core in plan view from a rotation axis direction, respectively.

First, an exemplary magnet embedded type motor of the embodiment will be described.

Figure 1:
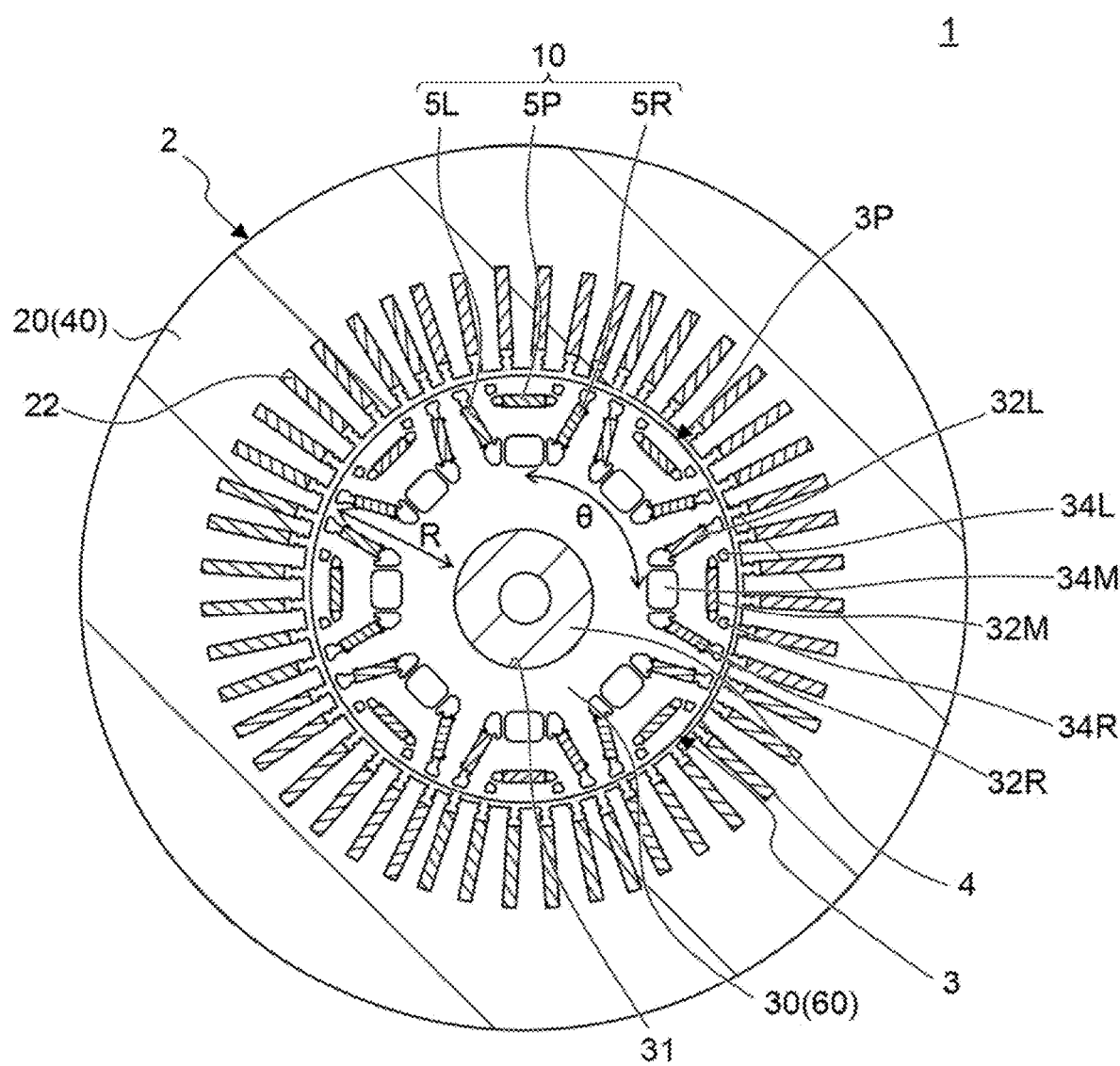
FIG. 1 is a schematic plan view illustrating an exemplary magnet embedded type motor of an embodiment.
Figure 2:
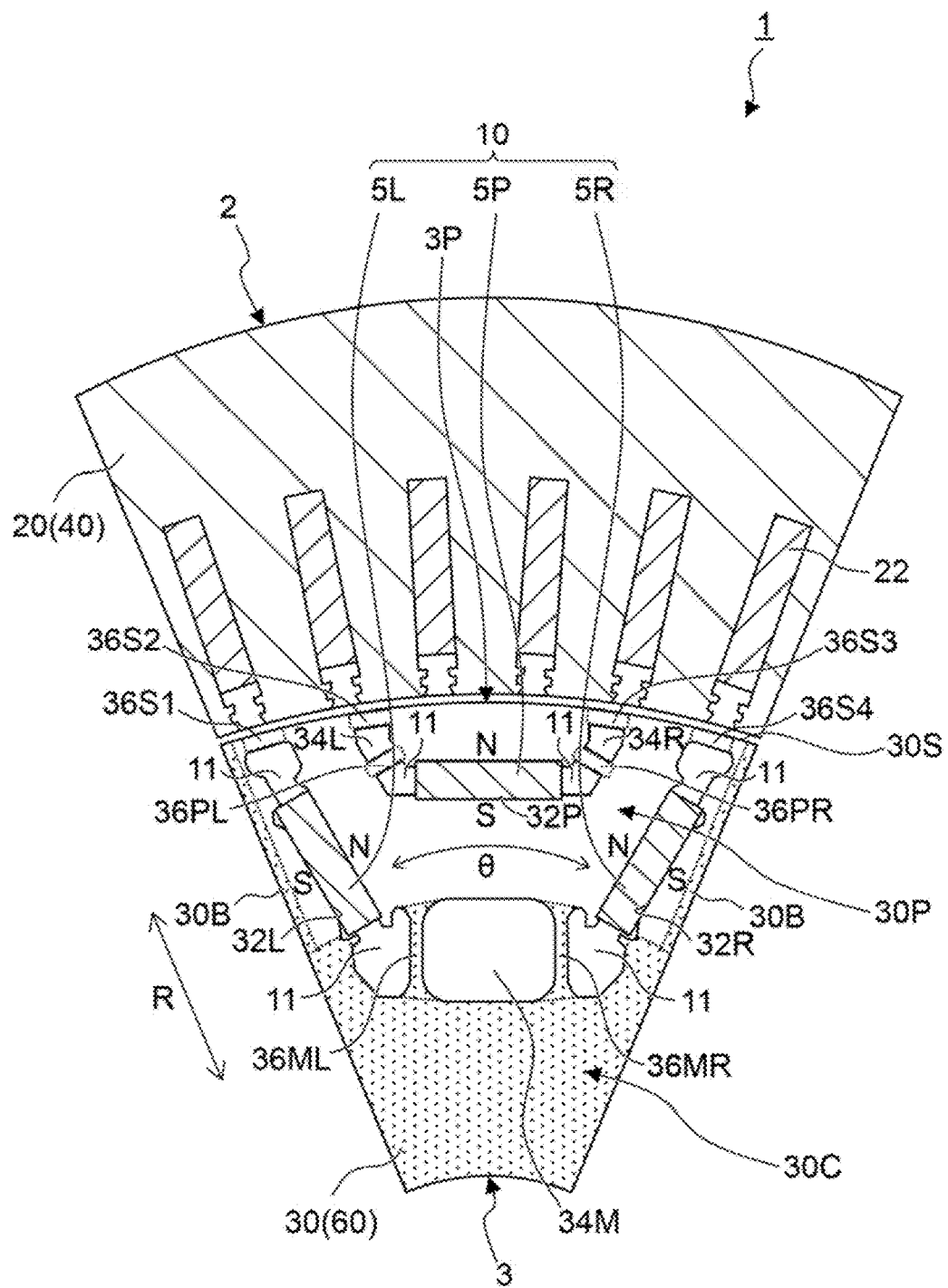
FIG. 2 is a schematic enlarged plan view illustrating a ⅛ model of the magnet embedded type motor illustrated in FIG. 1.
Figure 3:
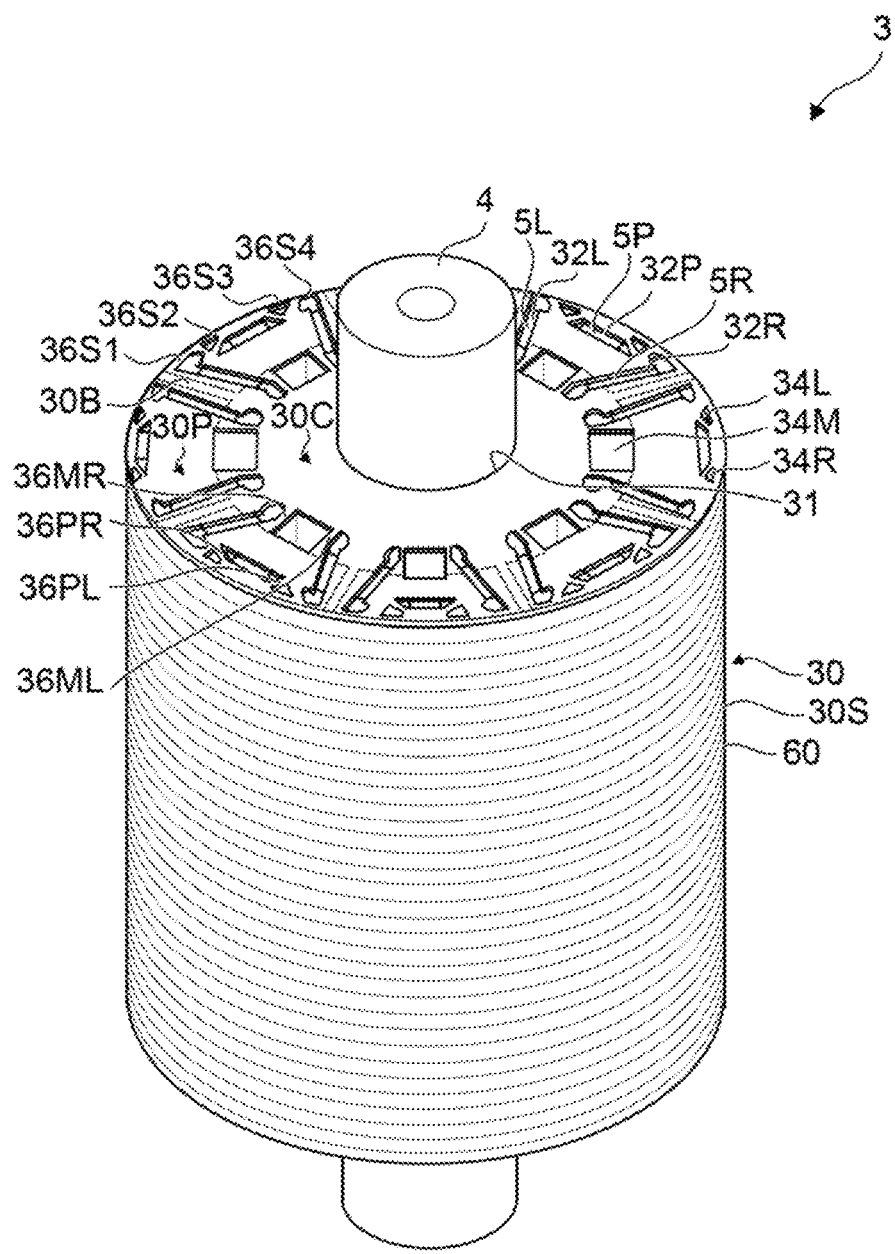
FIG. 3 is a schematic perspective view of a rotor illustrated in FIG. 1.

Here, FIG. 1 is a schematic plan view illustrating an exemplary magnet embedded type motor of the embodiment. FIG. 2 is a schematic enlarged plan view illustrating a ⅛ model of the magnet embedded type motor illustrated in FIG. 1. FIG. 3 is a schematic perspective view of a rotor illustrated in FIG. 1.

As illustrated in FIG. 1, a magnet embedded type motor 1 of this example includes a stator 2 and a rotor 3 rotatably disposed inside the stator 2.

The stator 2 includes a stator core 20 and a plurality of coils 22 wound around the stator core 20. In the stator core 20, a plurality of annular metal foils 40 (only the metal foil 40 at an end in the rotation axis direction is illustrated), which are made of an amorphous soft magnetic material, are laminated in the rotation axis direction. The coils 22 are disposed at regular intervals on the inner peripheral side of the stator core 20 in concentrated winding, distributed winding, or the like and a rotating magnetic field to rotate the rotor 3 is generated when the coils 22 are energized.

The rotor 3 includes a rotor core 30, a rotary shaft 4, and eight magnet groups 10. The rotary shaft 4 is inserted through a shaft hole 31 formed in the center of the rotor core 30. The eight magnet groups 10 are embedded in the rotor core 30 along a circumferential direction θ at every 45°. In the rotor core 30, a plurality of circular-shaped metal foils 60 are laminated in the rotation axis direction. The rotary shaft 4 is made of metal, and secured to the rotor core 30 by caulking and the like (not illustrated) in a state of being inserted through the shaft hole 31 of the rotor core 30. One magnet group 10 includes a pair of radially arranged magnets 5L, 5R and a circumferentially arranged magnet 5P. In the rotor 3, eight magnetic poles 3P are formed by the respective eight magnet groups 10.

As illustrated in FIG. 2, in the magnet group 10, the circumferentially arranged magnet 5P has the N-pole on the side adjacent to the stator 2, and has the S-pole on the opposite side. The pair of radially arranged magnets 5L, 5R are disposed so as to each have a polarity opposite to a polarity of the circumferentially arranged magnet 5P. That is, since the pair of radially arranged magnets 5L, 5R are close to the S-pole compared with the N-pole of the circumferentially arranged magnet 5P, the pair of radially arranged magnets 5L, 5R have the N-pole on the sides adjacent to the circumferentially arranged magnet 5P. While the illustration is omitted, the pair of radially arranged magnets 5L, 5R and the circumferentially arranged magnet 5P each have the N-pole and the S-pole opposite between the magnet groups 10 of the magnetic poles 3P mutually adjacent in the circumferential direction θ of the rotor core 30.

The rotor core 30 is provided with a pair of radially arranged magnet holes 32L, 32R for each magnetic pole 3P on an outer peripheral portion 30P where magnetic fluxes of the magnets are flown toward the stator 2. The pair of radially arranged magnet holes 32L, 32R extend in a radial direction R and penetrate in the rotation axis direction. A center side magnetic flux leakage prevention hole 34M is provided between the center side ends of the pair of radially arranged magnet holes 32L, 32R. The center side magnetic flux leakage prevention hole 34M extends in the circumferential direction θ and penetrates in the rotation axis direction. Furthermore, the rotor core 30 includes center side bridge portions 36ML, 36MR that separate the pair of radially arranged magnet holes 32L, 32R from the center side magnetic flux leakage prevention hole 34M.

Furthermore, the rotor core 30 is provided with a circumferentially arranged magnet hole 32P between outer peripheral side ends of the pair of radially arranged magnet holes 32L, 32R for each magnetic pole 3P. The circumferentially arranged magnet hole 32P extends in the circumferential direction θ, and penetrates in the rotation axis direction. Outer peripheral side magnetic flux leakage prevention holes 34L, 34R are provided between an outer peripheral surface 30S and both ends in the circumferential direction θ of the circumferentially arranged magnet hole 32P so as to penetrate in the rotation axis direction. Furthermore, the rotor core 30 includes outer peripheral side bridge portions 36PL, 36PR that separate the circumferentially arranged magnet hole 32P from the outer peripheral side magnetic flux leakage prevention holes 34L, 34R. The rotor core 30 includes outer peripheral side bridge portions 36S1 to 36S4 that separate the pair of radially arranged magnet holes 32L, 32R and the outer peripheral side magnetic flux leakage prevention holes 34L, 34R from the outer peripheral surface 30S.

In the rotor core 30, for each magnetic pole 3P, the pair of radially arranged magnets 5L, 5R extending in the radial direction R are embedded in the pair of radially arranged magnet holes 32L, 32R, and the circumferentially arranged magnet 5P extending in the circumferential direction θ is embedded in the circumferentially arranged magnet hole 32P. A resin 11 is filled in gaps on both end sides in the radial direction of the pair of radially arranged magnets 5L, 5R in the pair of radially arranged magnet holes 32L, 32R, and the resin 11 is filled in gaps on both end sides in the circumferential direction of the circumferentially arranged magnet 5P in the circumferentially arranged magnet hole 32P.

In the rotor core 30, the center side bridge portions 36ML, 36MR, a center portion 30C on the center side with respect to the outer peripheral portion 30P, and an inter-magnetic pole portion 30B between the magnetic poles 3P mutually adjacent in the circumferential direction θ are made of a nanocrystalline soft magnetic material, and another portion is made of an amorphous soft magnetic material.

The nanocrystalline soft magnetic material has saturation magnetization higher than that of the amorphous soft magnetic material. Therefore, the center side bridge portions 36ML, 36MR of the rotor core 30 made of the nanocrystalline soft magnetic material causes the magnetic flux generated by the pair of radially arranged magnets 5L, 5R to easily flow to the center side with respect to the center side magnetic flux leakage prevention hole 34M via the center side bridge portions 36ML, 36MR. Accordingly, while a magnetic flux contributing to a magnet torque among the magnetic fluxes generated by the pair of radially arranged magnets 5L, 5R and the circumferentially arranged magnet 5P decreases, a counter electromotive voltage generated at the coil on the stator side due to the magnetic flux is reduced. Meanwhile, the center portion 30C and the inter-magnetic pole portions 30B of the rotor core 30 made of the nanocrystalline soft magnetic material causes increase of a magnetic flux contributing to a reluctance torque.

Therefore, the magnet embedded type motor 1 of this example can reduce the counter electromotive voltage while suppressing the reduction of the torque. Accordingly, since a current applied to the coil 22 of the stator 2 for performing a field weakening control can be reduced, the efficiency of the motor 1 can be improved, and the increase of the counter electromotive voltage in a high speed rotation of the motor 1 can be suppressed, thus ensuring enhancing the output of the motor 1.

Subsequently, the configurations of the magnet embedded type motor of the embodiment will be each described in detail.

1. Rotor

The rotor includes the rotor core where a plurality of metal foils are laminated and the plurality of magnet groups that are embedded in the rotor core along the circumferential direction and form the plurality of respective magnetic poles.

The rotor core is provided with the pair of radially arranged magnet holes, the center side magnetic flux leakage prevention hole, and the center side bridge portions for each magnetic pole. The pair of radially arranged magnet holes extend in the radial direction in the outer peripheral portion. The center side magnetic flux leakage prevention hole extend in the circumferential direction between the center side ends of the pair of radially arranged magnet holes. The center side bridge portions separate the pair of radially arranged magnet holes from the center side magnetic flux leakage prevention hole. The pair of radially arranged magnets are embedded in the pair of radially arranged magnet holes of the rotor core. The pair of radially arranged magnets are included in the magnet group and extend in the radial direction. In the rotor core, the center side bridge portion, the center portion on the center side with respect to the outer peripheral portion, and the inter-magnetic pole portion between the magnetic poles mutually adjacent in the circumferential direction are made of the nanocrystalline soft magnetic material, and another portion is made of the amorphous soft magnetic material.

Here, the "outer peripheral portion" means a region on the outer peripheral side of the rotor core, like the outer peripheral portion 30P illustrated in FIG. 2, where the magnetic flux of the magnet is flown toward the stator. The "center portion" means a region of the rotor core on the center side with respect to the outer peripheral portion like the center portion 30C illustrated in FIG. 2. Furthermore, the "inter-magnetic pole portion" means a region between the magnetic poles adjacent in the circumferential direction of the rotor core, like the inter-magnetic pole portion 30B illustrated in FIG. 2, and specifically, means a region between the radially arranged magnets of the circumferentially adjacent magnetic poles. While the inter-magnetic pole portion is not specifically limited, the inter-magnetic pole portion may be a region continuous from the center portion to the outer peripheral surface of the rotor core like the inter-magnetic pole portion 30B illustrated in FIG. 2.

The thickness of the metal foil may be, for example, in a range of 0.01 mm to 0.05 mm. This is because by setting to the upper limit or less of the range, a loss during the use of the motor can be suppressed. A portion constituting the center side bridge portion, the center portion, and the inter-magnetic pole portion of the rotor core in the metal foil is made of the nanocrystalline soft magnetic material, and another portion is made of the amorphous soft magnetic material.

While the amorphous soft magnetic material or the nanocrystalline soft magnetic material includes, for example, a material containing at least one magnetic metal selected from the group consisting of Fe, Co, and Ni and at least one non-magnetic metal selected from the group consisting of B, C, P, Al, Si, Ti, V, Cr, Mn, Cu, Y, Zr, Nb, Mo, Hf, Ta, and W, the amorphous soft magnetic material or the nanocrystalline soft magnetic material is not limited to them.

While a representative material of the amorphous soft magnetic material or the nanocrystalline soft magnetic material includes, for example, a FeCo alloy (FeCo, FeCoV, and the like), a FeNi alloy (FeNi, FeNiMo, FeNiCr, FeNiSi, and the like), a FeAl alloy or a FeSi alloy (FeAl, FeAlSi, FeAlSiCr, FeAlSiTiRu, FeAlO, and the like), a FeTa alloy (FeTa, FeTaC, FeTaN, and the like), and a FeZr alloy (FeZrN and the like), the material is not limited to them. In the case of the Fe alloy, Fe may be contained by 80 at % or more.

As another material of the amorphous soft magnetic material or the nanocrystalline soft magnetic material, for example, a Co alloy that contains Co and at least one of Zr, Hf, Nb, Ta, Ti, or Y can be used. The Co alloy may contain Co by 80 at % or more. Such a Co alloy easily become amorphous in film formation, and is low in crystal magnetic anisotropy, crystal defect, and grain boundary, thus having extremely excellent soft magnetic property. The amorphous soft magnetic material includes, for example, a CoZr alloy, a CoZrNb alloy, and a CoZrTa alloy in some embodiments.

The amorphous soft magnetic material in this description is a soft magnetic material that has an amorphous structure as a main structure. In the case of the amorphous structure, an X-ray diffraction pattern does not have an apparent peak, and only a broad halo pattern is observed. Meanwhile, while a nanocrystalline structure can be formed by performing a heat treatment on the amorphous structure, the diffraction peak is observed at a position corresponding to a grid interval on a crystal face in the nanocrystalline soft magnetic material having the nanocrystalline structure. The crystallite diameter can be calculated from the width of the diffraction peak using the Scherrer's formula.

For the nanocrystalline soft magnetic material in this description, the nanocrystal has a crystallite diameter of less than 1 μm calculated from a half-value width of the diffraction peak in the X-ray diffraction by Scherrer's formula. In this embodiment, the crystallite diameter (crystallite diameter calculated from the half-value width of the diffraction peak in the X-ray diffraction by the Scherrer's formula) of the nanocrystal may be 100 nm or less, or 50 nm or less. The crystallite diameter of the nanocrystal may be 5 nm or more. The crystallite diameter of the nanocrystal is this size, thereby improving the soft magnetic property. A conventional magnetic steel sheet has the crystallite diameter in the order of μm, and typically 50 μm or more.

Here, as apparent from Example described later, the nanocrystalline soft magnetic material has saturation magnetization higher than that of the amorphous soft magnetic material.

The plurality of magnet groups are ordinarily embedded in the rotor core 30 along the circumferential direction θ at regular intervals like the eight magnet groups 10 illustrated in FIG. 2.

The rotor core is ordinarily provided with a circumferentially arranged magnet hole extending in the circumferential direction between outer peripheral side ends of the pair of radially arranged magnet holes for each magnetic pole like the rotor core 30 illustrated in FIG. 2. The magnet group ordinarily includes the circumferentially arranged magnet that is embedded in the circumferentially arranged magnet hole and extends in the circumferential direction in addition to the pair of radially arranged magnets like the magnet group 10 illustrated in FIG. 2. The magnets are permanent magnets. While the shape of the magnet is not specifically limited, the shape includes, for example, a rectangular parallelepiped shape where a planar shape is a rectangular shape having long sides and short sides and a side shape is a rectangular shape having long sides and short sides like the pair of radially arranged magnets 5L, 5R and the circumferentially arranged magnet 5P illustrated in FIG. 1.

The magnet includes a ferrite magnet, an alnico magnet, and the like in addition to a rare earth magnet, such as a neodymium magnet containing neodymium, iron, and boron as main components and a samarium cobalt magnet containing samarium and cobalt as main components.

The rotor core may be a rotor core where the outer peripheral side magnetic flux leakage prevention hole is provided between the outer peripheral surface and both ends in the circumferential direction of the circumferentially arranged magnet hole. In particular, like the rotor core 30 illustrated in FIG. 2, the outer peripheral side bridge portion that separates the circumferentially arranged magnet hole from the outer peripheral side magnetic flux leakage prevention hole and the outer peripheral side bridge portion that separates the outer peripheral side magnetic flux leakage prevention hole from the outer peripheral surface are disposed in some embodiments. The rotor core may be a rotor core where the outer peripheral side bridge portions that separate the pair of radially arranged magnet holes from the outer peripheral surface are disposed like the rotor core 30 illustrated in FIG. 2.

In the rotor, the resin may be filled in the gaps on both end sides in the radial direction of the radially arranged magnet in the radially arranged magnet hole like the rotor 3 illustrated in FIG. 2. Similarly, the resin may be filled in the gaps on both end sides in the circumferential direction of the circumferentially arranged magnet in the circumferentially arranged magnet hole. The resin includes, for example, a thermosetting resin excellent in formability and heat resistance. The thermosetting resin includes an epoxy resin, a polyimide resin, and the like.

In the rotor, while an adhesive layer of a heat resistant resin and the like may be disposed between the metal foils of the rotor core, the adhesive layer does not need to be disposed insofar as the lamination state of the metal foil is maintained. The heat resistant resin includes a thermosetting resin and the like. The thermosetting resin includes an epoxy resin, a polyimide resin, a polyamide-imide resin, an acrylic resin, or the like.

2. Stator

The stator includes the stator core and the coil wound around the stator core.

While the stator core is not specifically limited insofar as the stator core is made of a magnetic material, the stator core includes, for example, a stator core where a plurality of metal plates made of a soft magnetic material are laminated like the stator 2 illustrated in FIG. 1. While the metal plate made of the soft magnetic material is not specifically limited, a magnetic steel sheet, a metal foil made of an amorphous soft magnetic material, a metal foil made of a nanocrystalline soft magnetic material, and the like are included. The thickness of the magnetic steel sheet is, for example, in a range of 0.1 mm to 0.5 mm. The thickness of the metal foil, and the amorphous soft magnetic material and the nanocrystalline soft magnetic material are similar to those described in "1. Rotor."

The coil is not specifically limited insofar as a rotating magnetic field to rotate the rotor is generated by energization. The coil may be disposed at regular intervals on the inner peripheral side of the stator core in distributed winding or may be disposed at regular intervals on the inner peripheral side of the stator core in concentrated winding like the coil 22 illustrated in FIG. 1.

3. Magnet Embedded Type Motor

The magnet embedded type motor is used as, for example, a drive source of a hybrid vehicle and an electric vehicle.

B. Method for Manufacturing Magnet Embedded Type Motor

The following describes an embodiment according to the method for manufacturing the magnet embedded type motor of the present disclosure.

The method for manufacturing the magnet embedded type motor of the embodiment is a method for manufacturing a magnet embedded type motor that includes a stator and a rotor rotatably disposed inside the stator, the method includes: a preparing step of preparing a metal foil made of an amorphous soft magnetic material, the metal foil with a shape corresponding to a shape of a rotor core of the rotor, the metal foil being provided with a pair of radially arranged magnet holes, a center side magnetic flux leakage prevention hole, and center side bridge portions for each magnetic pole of the rotor, the pair of radially arranged magnet holes extending in a radial direction in an outer peripheral portion, the center side magnetic flux leakage prevention hole extending in a circumferential direction between center side ends of the pair of radially arranged magnet holes, the center side bridge portions separating the pair of radially arranged magnet holes from the center side magnetic flux leakage prevention hole; a transforming step of heating the center side bridge portion, a center portion, and an inter-magnetic pole portion of the metal foil to transform the heated portions to a nanocrystalline soft magnetic material while keeping a part other than the center side bridge portion, the center portion, and the inter-magnetic pole portion to an amorphous soft magnetic material, the center portion being a center side with respect to the outer peripheral portion, the inter-magnetic pole portion being between the magnetic poles mutually adjacent in the circumferential direction of the rotor; and a rotor manufacturing step of manufacturing the rotor by laminating the transformed metal foils and embedding a pair of radially arranged magnets in the pair of radially arranged magnet holes of a laminated body of the metal foils. Here, the "circumferential direction" and the "radial direction" mean the circumferential direction and the radial direction of the metal foil, respectively. The "center" and the "outer periphery" mean the center and the outer periphery of the metal foil in plan view, respectively.

First, as an exemplary method for manufacturing the magnet embedded type motor of the embodiment, an exemplary method for manufacturing the magnet embedded type motor 1 illustrated in FIG. 1 will be described. Here, FIG. 4A and FIG. 4B are schematic process perspective views illustrating processes of a main part in the exemplary method for manufacturing the magnet embedded type motor illustrated in FIG. 1.

Figure 4A:
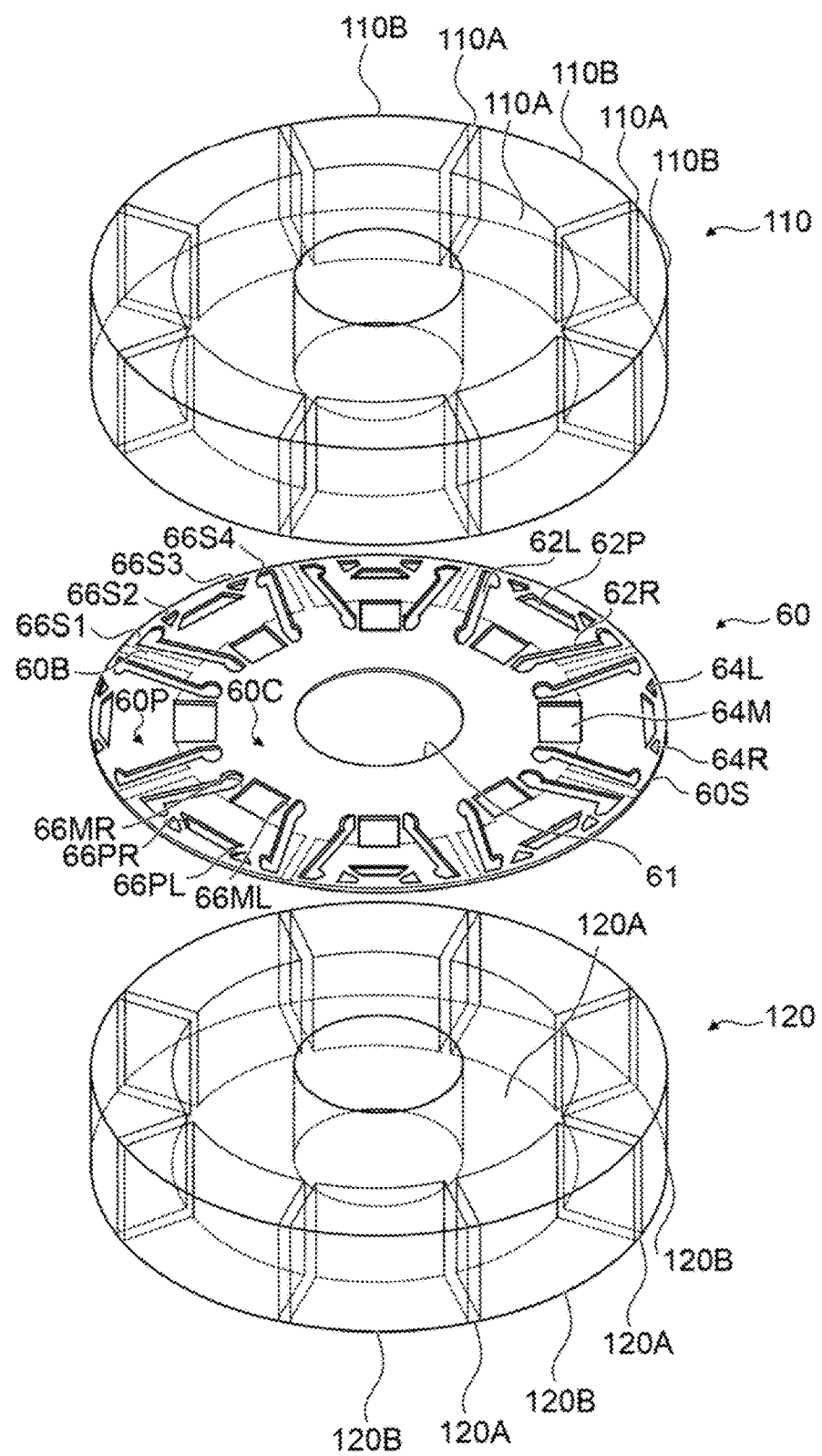
FIG. 4A is a schematic process perspective view illustrating a process of a main part in an exemplary method for manufacturing the magnet embedded type motor illustrated in FIG. 1.
Figure 4B:
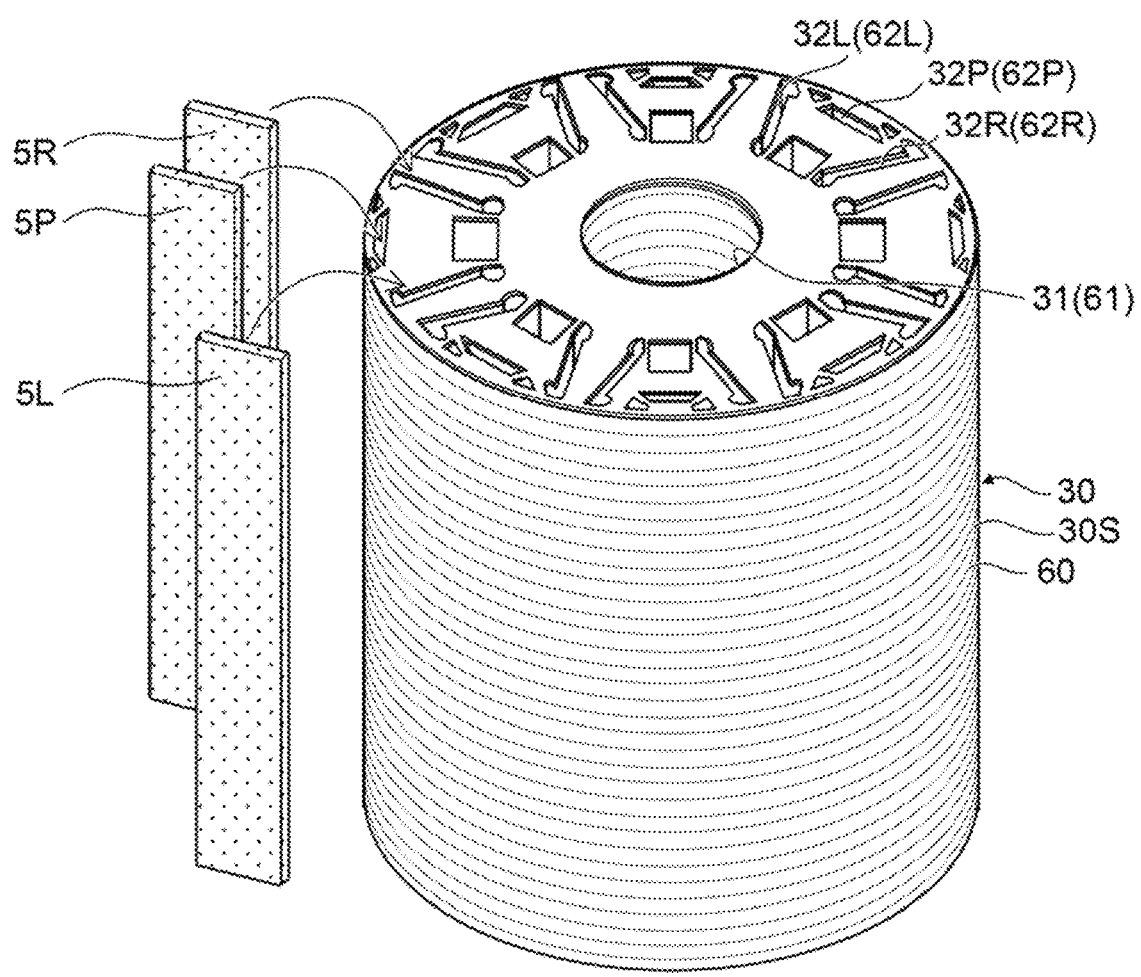
FIG. 4B is a schematic process perspective view illustrating a process of the main part in the exemplary method for manufacturing the magnet embedded type motor illustrated in FIG. 1.

In the method for manufacturing the magnet embedded type motor of this example, first, a plurality of metal foils 60 (the metal foil 60 is illustrated in FIG. 4A) constituting the rotor core 30 of the rotor 3 illustrated in FIG. 1 is prepared (preparing step).

The metal foil 60 is made of the amorphous soft magnetic material and has a shape corresponding to that of the rotor core 30 illustrated in FIG. 1. Specifically, as illustrated in FIG. 4A, the metal foil 60 is provided with a pair of radially arranged magnet holes 62L, 62R, a center side magnetic flux leakage prevention hole 64M, and center side bridge portions 66ML, 66MR that have the shapes corresponding to those of the pair of radially arranged magnet holes 32L, 32R, the center side magnetic flux leakage prevention hole 34M, and the center side bridge portions 36ML, 36MR illustrated in FIG. 1 to FIG. 3. A circumferentially arranged magnet hole 62P, outer peripheral side magnetic flux leakage prevention holes 64L, 64R, and outer peripheral side bridge portions 66PL, 66PR are formed to have the shapes corresponding to those of the circumferentially arranged magnet hole 32P, the outer peripheral side magnetic flux leakage prevention holes 34L, 34R, and the outer peripheral side bridge portions 36PL, 36PR illustrated in FIG. 1 to FIG. 3. Outer peripheral side bridge portions 66S1 to 66S4 are formed to have the shapes corresponding to those of the outer peripheral side bridge portions 36S1 to 36S4 illustrated in FIG. 1 to FIG. 3. Furthermore, the metal foil 60 includes a shaft hole 61, an outer peripheral surface 60S, an outer peripheral portion 60P, a center portion 60C, and inter-magnetic pole portions 60B that have the shapes corresponding to those of the shaft hole 31, the outer peripheral surface 30S, the outer peripheral portion 30P, the center portion 30C, and the inter-magnetic pole portions 30B illustrated in FIG. 1 to FIG. 3.

Next, in each of the metal foils 60, the center side bridge portions 66ML, 66MR, the center portion 60C, and the inter-magnetic pole portions 60B are heated to transform the heated portions from the amorphous soft magnetic material to the nanocrystalline soft magnetic material while keeping a part of the metal foil 60 other than the center side bridge portions 66ML, 66MR, the center portion 60C, and the inter-magnetic pole portions 60B to the amorphous soft magnetic material (transforming step).

Specifically, as illustrated in FIG. 4A, the metal foil 60 is sandwiched between a pair of molds 110, 120 that include heating blocks 110A, 120A, which includes heaters (not illustrated), at 415° C. and cooling blocks 110B, 120B, in which a refrigerant (not illustrated) flows, at 0° C., thus bringing the pair of cooling blocks 110B, 120B into contact with the part other than the center side bridge portions 66ML, 66MR, the center portion 60C, and the inter-magnetic pole portions 60B, and simultaneously bringing the pair of heating blocks 110A, 120A into contact with the center side bridge portions 66ML, 66MR, the center portion 60C, and the inter-magnetic pole portions 60B. This state is kept for five seconds. Accordingly, by heating the center side bridge portions 66ML, 66MR, the center portion 60C, and the inter-magnetic pole portions 60B to a temperature of a crystallization temperature or more and keeping them at the temperature of the crystallization temperature or more for five seconds, these portions can be transformed to the nanocrystalline soft magnetic material while the part other than the center side bridge portions 66ML, 66MR, the center portion 60C, or the inter-magnetic pole portions 60B are kept to the amorphous soft magnetic material by suppressing the influence of heating by the cooling blocks 110B, 120B.

Next, as illustrated in FIG. 4B, a plurality of the transformed metal foils 60 are laminated in the thickness direction such that the positions in the in-plane direction of the pair of radially arranged magnet holes 62L, 62R and the circumferentially arranged magnet hole 62P match one another among the plurality of the transformed metal foils 60. Accordingly, a laminated body (rotor core) 30 of the plurality of the transformed metal foils 60 is manufactured, thus forming the pair of radially arranged magnet holes 32L, 32R and the circumferentially arranged magnet hole 32P of the laminated body 30. Subsequently, the pair of radially arranged magnets 5L, 5R and the circumferentially arranged magnet 5P are embedded in the pair of radially arranged magnet holes 32L, 32R and the circumferentially arranged magnet hole 32P of the laminated body 30, respectively. Specifically, after inserting the magnets 5L, 5R, and 5P into the magnet holes 62L, 62R, and 62P, the magnet holes 62L, 62R, and 62P are sealed with the resin. Furthermore, the rotary shaft is inserted through the shaft hole 31 formed in the center of the rotor core 30. Thus, the rotor 3 illustrated in FIG. 1 to FIG. 3 is manufactured (rotor manufacturing step).

Next, the rotor 3 is combined with the stator 2 illustrated in FIG. 1 to manufacture the magnet embedded type motor 1 illustrated in FIG. 1.

In the magnet embedded type motor 1 manufactured by the manufacturing method of this example, the center side bridge portions 36ML, 36MR of the rotor core 30 is made of the nanocrystalline soft magnetic material. Therefore, since the saturation magnetization of the nanocrystalline soft magnetic material is higher than the saturation magnetization of the amorphous soft magnetic material, the magnetic flux generated by the pair of radially arranged magnets 5L, 5R easily flows to the center side with respect to the center side magnetic flux leakage prevention hole 34M via the center side bridge portions 36ML, 36MR. Accordingly, while a magnetic flux contributing to a magnet torque among the magnetic fluxes generated by the pair of radially arranged magnets 5L, 5R and the circumferentially arranged magnet 5P decreases, a counter electromotive voltage generated at the coil on the stator side due to the magnetic flux is reduced. Meanwhile, the center portion 30C and the inter-magnetic pole portions 30B of the rotor core 30 made of the nanocrystalline soft magnetic material causes increase of a magnetic flux contributing to a reluctance torque.

Accordingly, the method for manufacturing the magnet embedded type motor of this example ensures the manufacture of the magnet embedded type motor 1 capable of reducing the counter electromotive voltage while suppressing the reduction of the torque with high productivity.

Subsequently, for the method for manufacturing the magnet embedded type motor of this embodiment, conditions of the respective steps will be mainly described in detail.

1. Preparing Step

In the preparing step, the metal foil made of the amorphous soft magnetic material is prepared. The metal foil has the shape corresponding to the shape of the rotor core of the rotor. The metal foil is provided with the pair of radially arranged magnet holes, the center side magnetic flux leakage prevention hole, and the center side bridge portions for each magnetic pole. The pair of radially arranged magnet holes extend in the radial direction in the outer peripheral portion. The center side magnetic flux leakage prevention hole extends in the circumferential direction between center side ends of the pair of radially arranged magnet holes. The center side bridge portions separate the pair of radially arranged magnet holes from the center side magnetic flux leakage prevention hole.

While the metal foil is not specifically limited insofar as the pair of radially arranged magnet holes, the center side magnetic flux leakage prevention hole, and the center side bridge portions are formed for each magnetic pole of the rotor, the metal foil is ordinarily a metal foil provided with the circumferentially arranged magnet hole extending in the circumferential direction between the outer peripheral side ends of the pair of radially arranged magnet holes for each magnetic pole like the metal foil 60 illustrated in FIG. 4A. The metal foil may be provided with the outer peripheral side magnetic flux leakage prevention holes between the outer peripheral surface and both ends in the circumferential direction of the circumferentially arranged magnet hole. Especially, like the metal foil 60 illustrated in FIG. 4A, the outer peripheral side bridge portions that separate the circumferentially arranged magnet hole from the outer peripheral side magnetic flux leakage prevention holes and the outer peripheral side bridge portions that separate the outer peripheral side magnetic flux leakage prevention holes from the outer peripheral surface are disposed in some embodiments. The metal foil includes the outer peripheral side bridge portions that separate the pair of radially arranged magnet holes from the outer peripheral surface like the metal foil 60 illustrated in FIG. 4A in some embodiments.

The metal foil can be obtained by, for example, spraying molten metal of a metal raw material to a rotating cooling roll to perform rapid cooling, thus manufacturing a strip-shaped metal ribbon made of the amorphous soft magnetic material, and subsequently, molding the metal ribbon into a shape corresponding to that of the rotor core by, for example, press molding.

The molten metal can be obtained as a uniform molten metal by, for example, melting the metal raw material blended so as to have the composition described in "A. Magnet embedded type motor 1. Rotor" described above at a high temperature by a high frequency melting furnace and the like. The speed of the rapid cooling is, for example, about $10^{6°}$ C./sec while depending on the material, and is not specifically limited insofar as the amorphous structure is obtained before the crystallization.

2. Transforming Step

In the transforming step, the center side bridge portion, the center portion, and the inter-magnetic pole portion of the metal foil are heated to transform the heated portions to the nanocrystalline soft magnetic material while keeping the part other than the center side bridge portion, the center portion, and the inter-magnetic pole portion to the amorphous soft magnetic material. The center portion is the center side with respect to the outer peripheral portion. The inter-magnetic pole portion is between the magnetic poles mutually adjacent in the circumferential direction of the rotor.

The method of the heat treatment of the metal foil is not specifically limited insofar as the center side bridge portion, the center portion, and the inter-magnetic pole portion are transformed to the nanocrystalline soft magnetic material while keeping the part other than the center side bridge portion, the center portion, and the inter-magnetic pole portion to the amorphous soft magnetic material. For example, the method includes a method where the center side bridge portion, the center portion, and the inter-magnetic pole portion are heated to the crystallization temperature or more and keep them at the temperature of the crystallization temperature or more for a predetermined time while keeping the part other than the center side bridge portion, the center portion, and the inter-magnetic pole portion to less than crystallization temperature. This method includes, specifically, like a method illustrated in FIG. 4A, a method where the metal foil is sandwiched between a pair of molds that include heating blocks and cooling blocks, thus bringing the pair of cooling blocks into contact with the part other than the center side bridge portion, the center portion, and the inter-magnetic pole portion, and simultaneously bringing the pair of heating blocks into contact with the center side bridge portion, the center portion, and the inter-magnetic pole portion, thus keeping the state for a predetermined time.

The crystallization temperature is a temperature at which the crystallization of the amorphous soft magnetic material occurs. Since an exothermic reaction occurs in the crystallization, the crystallization temperature can be determined by measuring the temperature at which heat generation due to the crystallization occurs in the heating process of the amorphous soft magnetic material. For example, the crystallization temperature can be measured under the condition of a predetermined heating rate (for example, 0.67 $Ks^{-1}$) using differential scanning calorimetry (DSC). While the crystallization temperature differs depending on the material and the heating rate, the crystallization temperature is, for example, in a range of 300° C. to 500° C. Similarly, the crystallization temperature of the nanocrystalline soft magnetic material can be measured by the differential scanning calorimetry (DSC). While the crystal has been already generated in the nanocrystalline soft magnetic material, heating to the crystallization temperature or more causes further crystallization. While the crystallization temperature of the nanocrystalline soft magnetic material differs depending on the material and the heating rate, the crystallization temperature is, for example, in a range of 300° C. to 500° C.

The heating temperature of the center side bridge portion, the center portion, and the inter-magnetic pole portion is not specifically limited insofar as the heating temperature is the crystallization temperature or more, and appropriately selected considering the composition of the metal foil, the magnetic property desired to be generated, and the like. For example, the heating temperature may be in a range of 350° C. or more to 600° C. or less, and in a range of 400° C. or more to 520° C. or less in some embodiments. This is because by setting the heating temperature to the lower limit or more of these ranges, the crystallization can be efficiently advanced. In addition, by setting the heating temperature to the upper limit or less of these ranges, excessive crystallization can be easily avoided to suppress the generation of by-products ($Fe_2B$ and the like).

The heating period of the center side bridge portion, the center portion, and the inter-magnetic pole portion is not specifically limited insofar as the heated portions can be transformed to the nanocrystalline soft magnetic material. For example, the heating period may be in a range of one second or more to 10 minutes or less, and in a range of one second or more to five minutes or less in some embodiments. While the atmosphere to perform the heat treatment of the metal foil is not specifically limited, the atmosphere may be an inert gas atmosphere and the like.

The part other than the center side bridge portion, the center portion, or the inter-magnetic pole portion only needs to be kept to the amorphous soft magnetic material. The temperature of the part other than the center side bridge portion, the center portion, or the inter-magnetic pole portion when the center side bridge portion, the center portion, and the inter-magnetic pole portion are heated is, for example, in a range of 0° C. to 200° C., and in a range of 20° C. to 150° C. in some embodiments.

3. Rotor Manufacturing Step

In the rotor manufacturing step, the rotor is manufactured by laminating the transformed metal foils and embedding a pair of radially arranged magnets in the pair of radially arranged magnet holes of a laminated body of the metal foils.

When the metal foils are laminated to manufacture the laminated body, the metal foils may be mutually joined via adhesive layers. The adhesive layer is similar to that in the explanation of "A. Magnet embedded type motor 1. Rotor" described above.

While the number of the metal foils laminated in the laminated body is not specifically limited, the number of the metal foils can be appropriately determined with a purpose of, for example, obtaining a desired torque of the motor. In the rotor manufacturing step, usually, the laminated body is bound by caulking and welding.

While the rotor manufacturing step is not specifically limited insofar as the pair of radially arranged magnets are embedded in the pair of radially arranged magnet holes of the laminated body of the metal foils, in the rotor manufacturing step, usually, the pair of radially arranged magnets and the circumferentially arranged magnet are embedded in the pair of radially arranged magnet holes and the circumferentially arranged magnet hole, respectively.

in the rotor manufacturing step, usually, the magnet holes are sealed with the resin after inserting the magnets into the magnet holes, thereby embedding the magnets in the magnet holes. The resin is similar to that in the explanation of "A. Magnet embedded type motor 1. Rotor" described above.

EXAMPLES

The following further specifically describes the embodiments according to the magnet embedded type motor and the method for manufacturing the same of the present disclosure with an example and comparative examples.

Example

Figure 5:
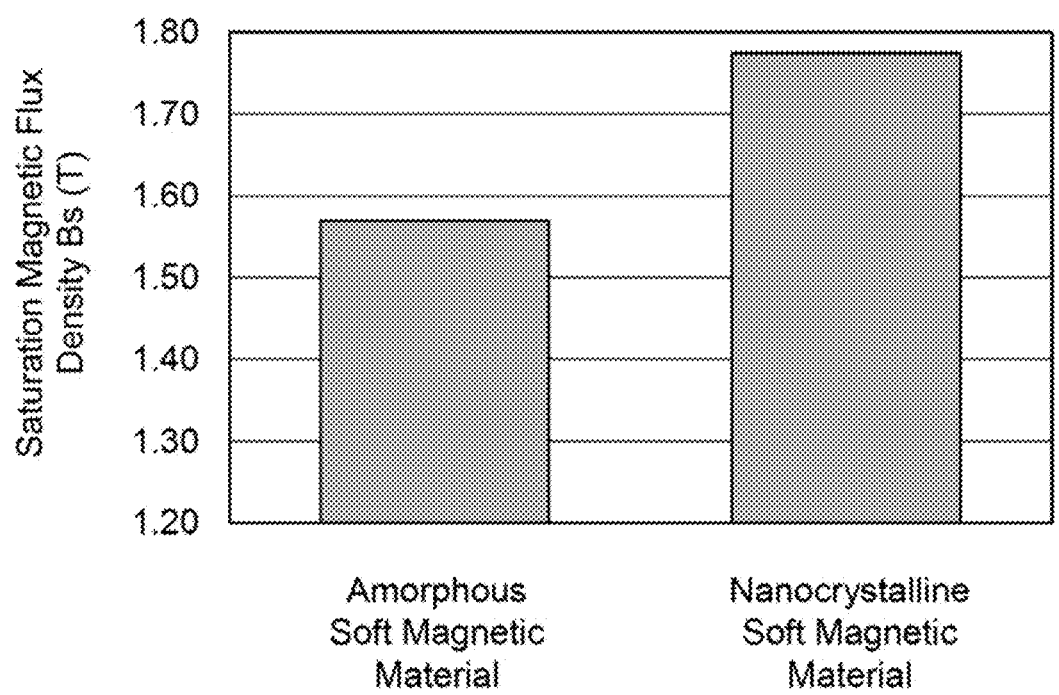
FIG. 5 illustrates saturation magnetic flux densities of an amorphous soft magnetic material and a nanocrystalline soft magnetic material.

An analytical model of the magnet embedded type motor illustrated in FIG. 1 to FIG. 3 was prepared. As indicated in Table 1 below, a physical property of the nanocrystalline soft magnetic material was given to the center side bridge portions 36ML, 36MR, the center portion 30C, and the inter-magnetic pole portion 30B of the rotor core, and a physical property of the amorphous soft magnetic material was given to the other part. The physical property of the amorphous soft magnetic material was given to the entire stator core. The physical properties of the amorphous soft magnetic material and the nanocrystalline soft magnetic material used for the analytical model are physical properties measured in advance. FIG. 5 illustrates saturation magnetic flux densities of the amorphous soft magnetic material and the nanocrystalline soft magnetic material.

Comparative Example 1

As indicated in Table 1 below, an analytical model was prepared similarly to Example excluding that the physical property of the amorphous soft magnetic material was given to the entire rotor core.

Comparative Example 2

As indicated in Table 1 below, an analytical model was prepared similarly to Example excluding that the physical property of the nanocrystalline soft magnetic material was given to the outer peripheral side bridge portions 36PL, 36PR, 36S1 to 36S4, and the center side bridge portions 36ML, 36MR of the rotor core, and the physical property of the amorphous soft magnetic material was given to the other part.

Comparative Example 3

As indicated in Table 1 below, an analytical model was prepared similarly to Example excluding that the physical property of the nanocrystalline soft magnetic material was given to the center side bridge portions 36ML, 36MR of the rotor core, and the physical property of the amorphous soft magnetic material was given to the other part.

Comparative Example 4

As indicated in Table 1 below, an analytical model was prepared similarly to Example excluding that the physical property of the nanocrystalline soft magnetic material was given to the center side bridge portions 36ML, 36MR, and the center portion 30C of the rotor core, and the physical property of the amorphous soft magnetic material was given to the other part.

TABLE 1

| | Rotor Core | | | | | |
|---|---|---|---|---|---|---|
| | Outer Peripheral Side Bridge Portion | Outer Peripheral Portion | Center Side Bridge Portion | Center Portion | Inter-Magnetic-Pole Portion | Entire Stator Core |
| Example | Amorphous | Amorphous | Nanocrystal | Nanocrystal | Nanocrystal | Amorphous |
| Comparative Example 1 | Amorphous | Amorphous | Amorphous | Amorphous | Amorphous | Amorphous |
| Comparative Example 2 | Nanocrystal | Amorphous | Nanocrystal | Amorphous | Amorphous | Amorphous |
| Comparative Example 3 | Amorphous | Amorphous | Nanocrystal | Amorphous | Amorphous | Amorphous |
| Comparative Example 4 | Amorphous | Amorphous | Nanocrystal | Nanocrystal | Amorphous | Amorphous |

*"Amorphous" means amorphous soft magnetic material, and "Nanocrystal" means nanocrystalline soft magnetic material.

[Evaluation of Counter Electromotive Voltage and Maximum Torque]

Figure 6:
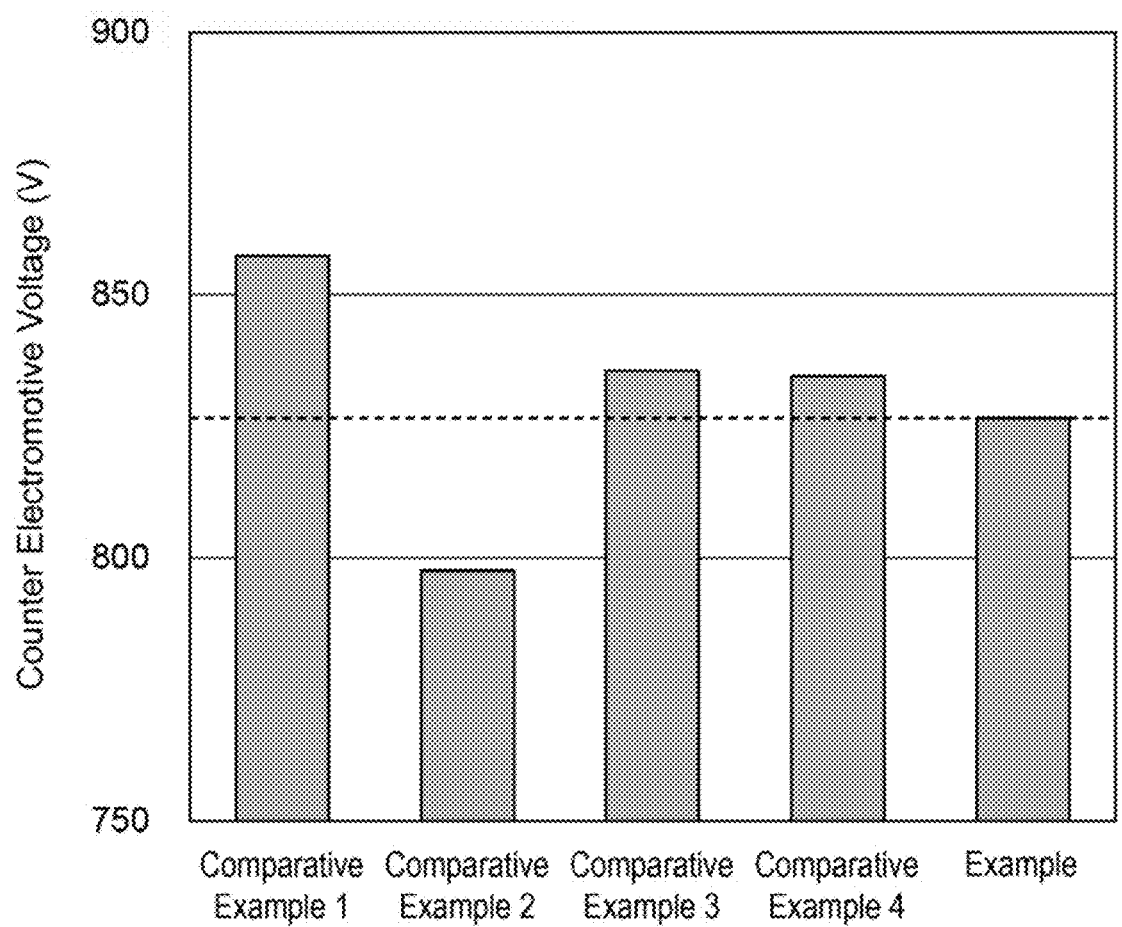
FIG. 6 is a graph illustrating counter electromotive voltages of Example and Comparative Examples 1 to 4.

The counter electromotive voltage and a torque of the motor (maximum torque) were calculated using the analytical models of Example and Comparative Examples 1 to 4. FIG. 6 is a graph indicating the counter electromotive voltages of Example and Comparative Examples 1 to 4, and FIG. 7 is a graph indicating the maximum torque of Example and Comparative Examples 1 to 4.

Figure 7:
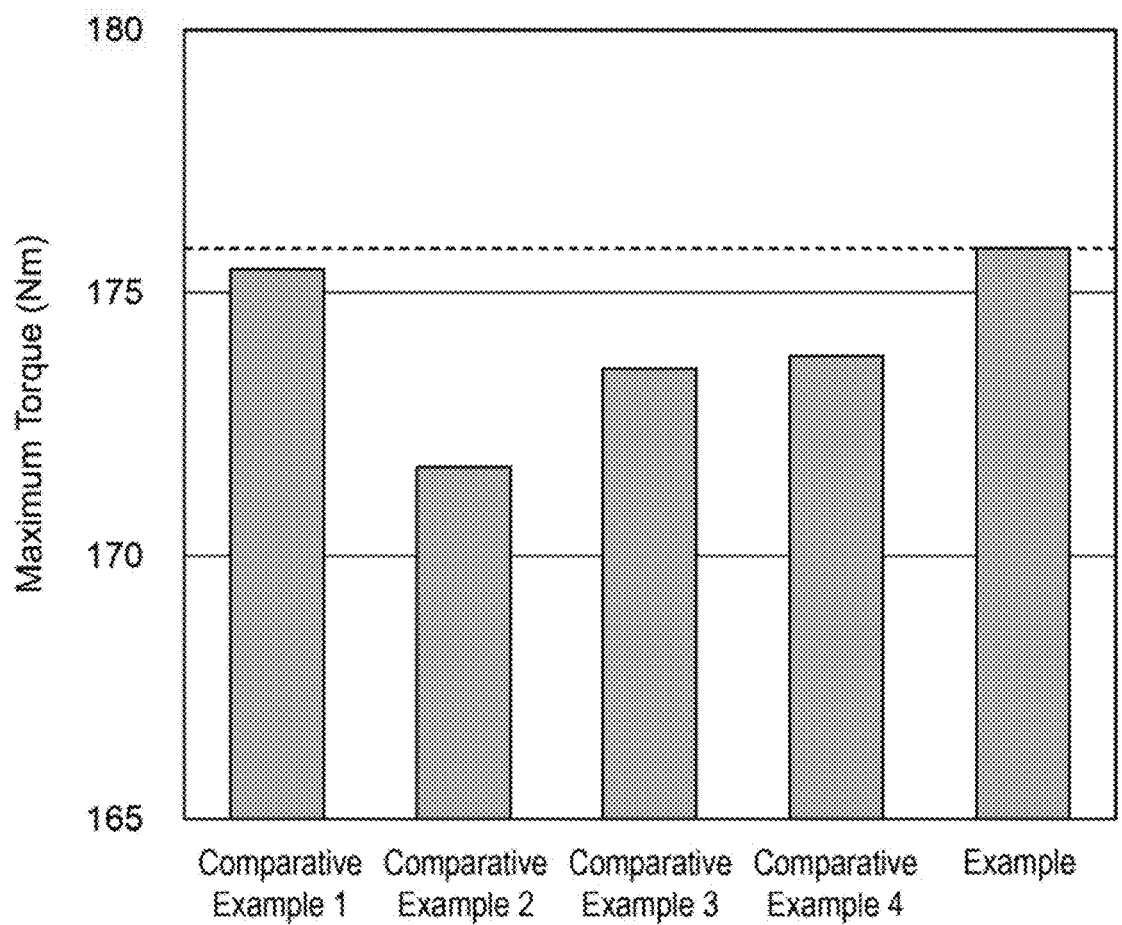
FIG. 7 is a graph illustrating maximum torques of Example and Comparative Examples 1 to 4.

As illustrated in FIG. 6 and FIG. 7, in Example, the reduction of the counter electromotive voltage was achieved while suppressing the decrease of the torque compared with Comparative Example 1 as the conventional example.

While the embodiments of the present disclosure have been described in detail above, the present disclosure is not limited thereto, and can be subjected to various kinds of changes in design without departing from the spirit and scope of the present disclosure described in the claims.

All publications, patents and patent applications cited in the present description are herein incorporated by reference as they are.

DESCRIPTION OF SYMBOLS

1 Magnet embedded type motor
2 Stator
20 Stator core
40 Metal foil
22 Coil
3 Rotor
30 Rotor core
30P Outer peripheral portion
30C Center portion
30B Inter-magnetic pole portion
60 Metal foil
10 Magnet group
5L, 5R Radially arranged magnet
5P Circumferentially arranged magnet
3P Magnetic pole
32L, 32R Pair of radially arranged magnet holes
32P Circumferentially arranged magnet hole
34M Center side magnetic flux leakage prevention hole
34L, 34R Outer peripheral side magnetic flux leakage prevention hole
36ML, 36MR Center side bridge portion
36PL, 36PR Outer peripheral side bridge portion
36S1 to 36S4 Outer peripheral side bridge portion

What is claimed is:

1. A magnet embedded type motor comprising:
a stator; and
a rotor rotatably disposed inside the stator,
wherein the stator includes a stator core and a coil wound around the stator core,
wherein the rotor includes a rotor core and a plurality of magnet groups, the rotor core includes a plurality of laminated metal foils, and the plurality of magnet groups are embedded in the rotor core along a circumferential direction and form a plurality of respective magnetic poles, and
wherein the rotor core has a pair of radially arranged magnet holes, a center side magnetic flux leakage prevention hole, and center side bridge portions for each magnetic pole, the pair of radially arranged magnet holes extend in a radial direction in an outer peripheral portion, the center side magnetic flux leakage prevention hole extends in a circumferential direction between center side ends of the pair of radially arranged magnet holes, and the center side bridge portions separate the pair of radially arranged magnet holes from the center side magnetic flux leakage prevention hole,
wherein a pair of radially arranged magnets are embedded in the pair of radially arranged magnet holes of the rotor core, and the pair of radially arranged magnets are included in the magnet group and extend in the radial direction,
wherein in the rotor core, the center side bridge portion, a center portion on the center side with respect to the outer peripheral portion, and an inter-magnetic pole portion between the magnetic poles mutually adjacent in the circumferential direction are made of a nanocrystalline soft magnetic material, and another portion is made of an amorphous soft magnetic material.

2. A method for manufacturing a magnet embedded type motor that includes a stator and a rotor rotatably disposed inside the stator, the method comprising:
preparing a metal foil made of an amorphous soft magnetic material, the metal foil with a shape corresponding to a shape of a rotor core of the rotor, the metal foil being provided with a pair of radially arranged magnet holes, a center side magnetic flux leakage prevention hole, and center side bridge portions for each magnetic pole of the rotor, the pair of radially arranged magnet holes extending in a radial direction in an outer peripheral portion, the center side magnetic flux leakage prevention hole extending in a circumferential direction between center side ends of the pair of radially arranged magnet holes, the center side bridge portions separating the pair of radially arranged magnet holes from the center side magnetic flux leakage prevention hole;

heating the center side bridge portion, a center portion, and an inter-magnetic pole portion of the metal foil to transform the heated portions to a nanocrystalline soft magnetic material while keeping a part other than the center side bridge portion, the center portion, and the inter-magnetic pole portion to an amorphous soft magnetic material, the center portion being a center side with respect to the outer peripheral portion, the inter-magnetic pole portion being between the magnetic poles mutually adjacent in the circumferential direction of the rotor; and manufacturing the rotor by laminating the transformed metal foils and embedding a pair of radially arranged magnets in the pair of radially arranged magnet holes of a laminated body of the metal foils.

* * * * *